(12) United States Patent
Schwenke et al.

(10) Patent No.: US 12,325,265 B2
(45) Date of Patent: Jun. 10, 2025

(54) COMMERCIAL VEHICLE TIRE

(71) Applicant: Continental Reifen Deutschland GmbH, Hannover (DE)

(72) Inventors: Andreas Schwenke, Isernhagen (DE); Florian Kristen, Burgwedel (DE); Chun Yi Yeo, Hannover (DE); Helge Rother, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 315 days.

(21) Appl. No.: 17/756,286

(22) PCT Filed: Oct. 13, 2020

(86) PCT No.: PCT/EP2020/078739
§ 371 (c)(1),
(2) Date: May 20, 2022

(87) PCT Pub. No.: WO2021/099031
PCT Pub. Date: May 27, 2021

(65) Prior Publication Data
US 2022/0402310 A1    Dec. 22, 2022

(30) Foreign Application Priority Data
Nov. 21, 2019    (DE) .................... 10 2019 217 940.0

(51) Int. Cl.
*B60C 11/12*    (2006.01)
*B60C 11/03*    (2006.01)
*B60C 11/13*    (2006.01)

(52) U.S. Cl.
CPC ... *B60C 11/0323* (2013.01); *B60C 2011/0353* (2013.01); *B60C 2011/1213* (2013.01); *B60C 2011/1338* (2013.01); *B60C 2200/06* (2013.01)

(58) Field of Classification Search
CPC ............. B60C 11/0323; B60C 11/1281; B60C 2011/1338
See application file for complete search history.

(56) References Cited

U.S. PATENT DOCUMENTS

2007/0062626 A1    3/2007  Oyama
2011/0168311 A1*   7/2011  Voss .................... B29D 30/0606
                                                        152/209.18
(Continued)

FOREIGN PATENT DOCUMENTS

DE    102017202939 A1    8/2018
DE    102017208010 A1 *  11/2018    ......... B60C 11/0323
(Continued)

OTHER PUBLICATIONS

English machine translation of KR101038020B1. (Year: 2011).*
(Continued)

*Primary Examiner* — Robert C Dye
(74) *Attorney, Agent, or Firm* — Richard A. Wolf; Gregory Adams

(57) ABSTRACT

Commercial vehicle tire of radial design with a tread with circumferential grooves formed to a profile depth, which divide the tread into at least two profile ribs (1) running in the central region of the tread with profile blocks (2) separated from one another by transverse grooves (3) and into shoulder-side profile ribs, wherein at least one of the circumferential grooves (4) adjoining a central profile rib (1) has, in cross section, a radially outer sipe-like narrow section (6) and a channel (8) adjoining this in the interior of the tread which is configured to be wider than the sipe-like narrow section (6) and which is delimited by two channel walls (8*b*) and a channel bottom (8*a*) forming the groove bottom, and wherein this circumferential groove (4) is interrupted in its course by entry points of transverse grooves (3).

(Continued)

Figure 3:
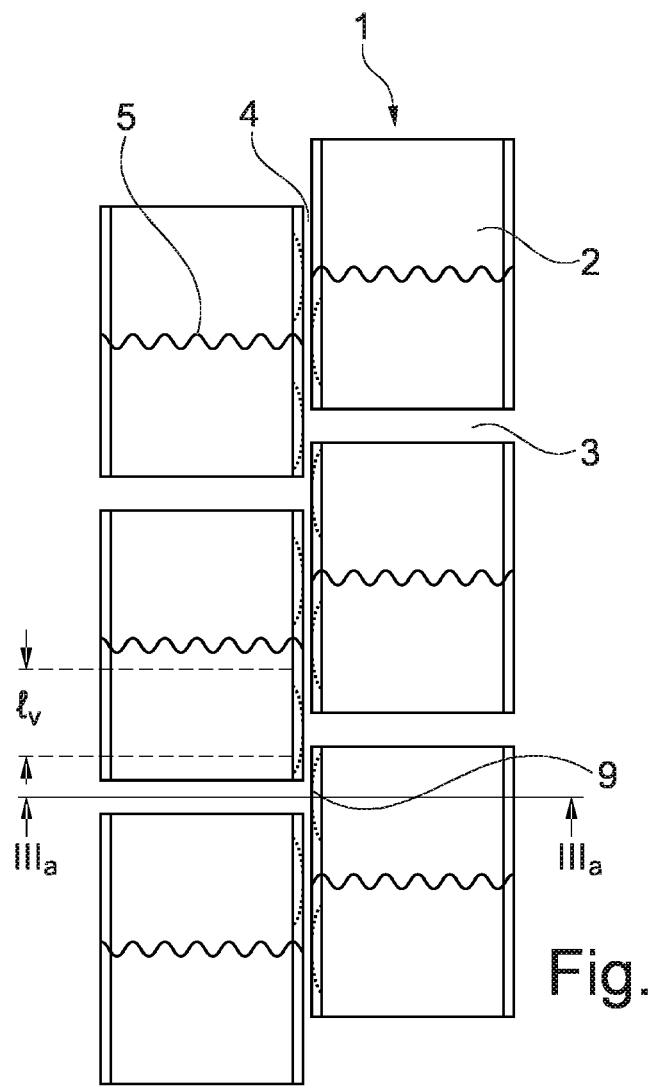

Opposite the entry points, a projection (9, 9') is formed locally in each case on the channel wall (8*b*) located opposite the entry points of the transverse grooves (3).

12 Claims, 3 Drawing Sheets

(56) References Cited

U.S. PATENT DOCUMENTS

| | | | |
|---|---|---|---|
| 2013/0146191 A1* | 6/2013 | Audigier | B60C 11/032 |
| | | | 152/209.21 |
| 2015/0059943 A1* | 3/2015 | Radulescu | B60C 11/04 |
| | | | 152/209.17 |
| 2016/0297252 A1* | 10/2016 | Cambon | B60C 11/0332 |
| 2018/0170116 A1* | 6/2018 | Daries | B60C 11/13 |
| 2018/0244111 A1 | 8/2018 | Zhu et al. | |
| 2019/0329600 A1 | 10/2019 | Jeon et al. | |
| 2020/0070586 A1* | 3/2020 | Ocana Amezcua | B60C 11/045 |
| 2020/0247189 A1 | 8/2020 | Lutz et al. | |
| 2021/0188011 A1* | 6/2021 | Bardin | B60C 11/12 |

FOREIGN PATENT DOCUMENTS

| | | | |
|---|---|---|---|
| EP | 3560733 A1 | | 10/2019 |
| JP | 201220702 A | | 2/2012 |
| KR | 101038020 B1 | * | 5/2011 |
| WO | 2017040007 A1 | | 3/2017 |

OTHER PUBLICATIONS

English machine translation of KR101038020 (Year: 2011).*
International Search Report dated Oct. 29, 2020 of International Application PCT/EP2020/078739 on which this application is based.

* cited by examiner

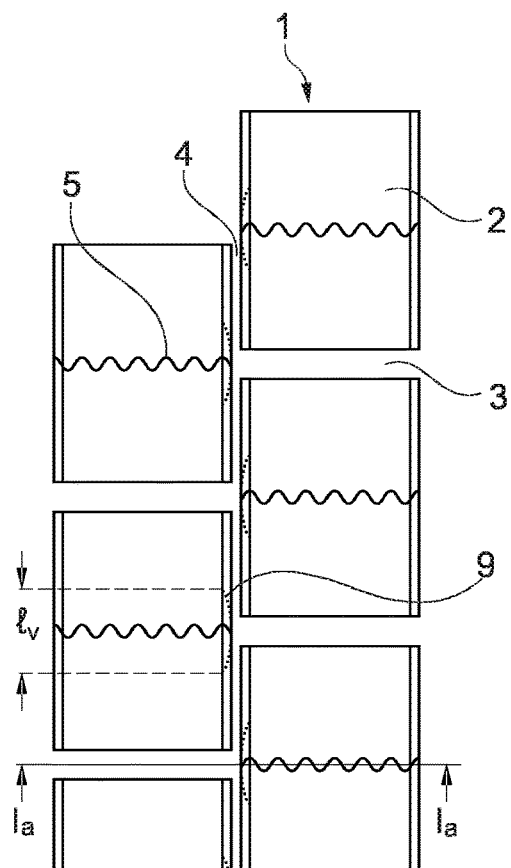
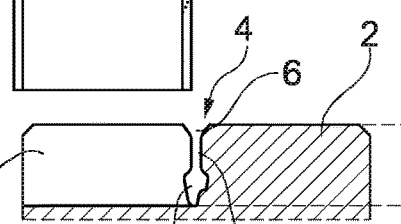
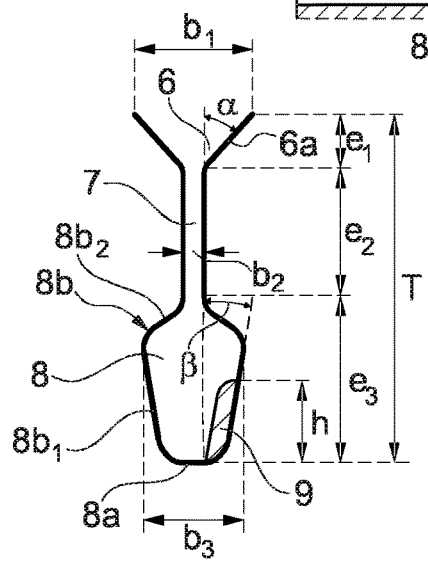 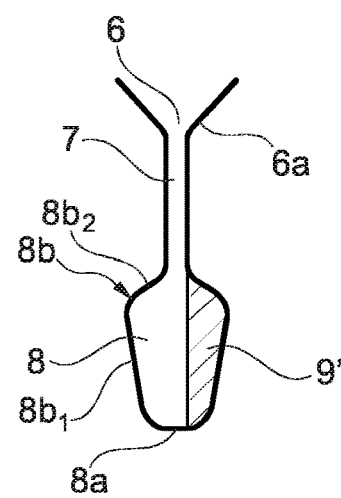
Fig. 1
Fig. 1a
Fig. 1b
Fig. 1c

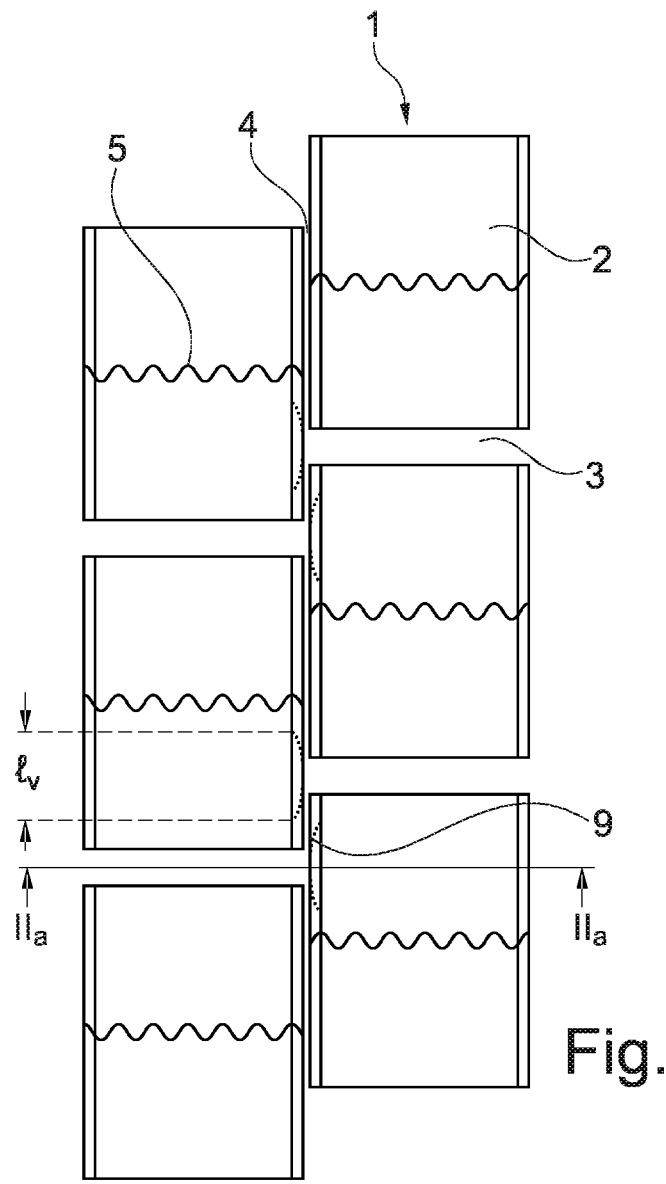
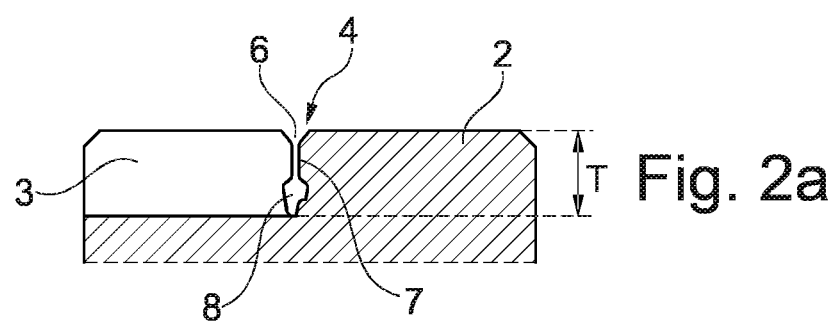
Fig. 2
Fig. 2a

COMMERCIAL VEHICLE TIRE

The invention relates to a commercial vehicle tire of radial design with a tread with circumferential grooves formed to a profile depth, which divide the tread into at least two profile ribs running in the central region of the tread with profile blocks separated from one another by transverse grooves, wherein at least one of the circumferential grooves adjoining a profile rib has, in cross section, a radially outer sipe-like narrow section and a channel adjoining this in the interior of the tread which is configured to be wider than the sipe-like narrow section and which is delimited by two channel walls and a channel bottom forming the groove bottom, and wherein this circumferential groove is interrupted in its course by entry points of transverse grooves.

Such a commercial vehicle tire is, for example, the Goodyear tire with the designation FuelMaxS. This tire has a central circumferential groove in the tread which is configured in accordance with "Intellix Profilrillen Technologie [profile groove technology]" and composed of a radially outer sipe-like narrow section and a channel adjoining this in the interior of the tread. A commercial vehicle tire is known from WO 2017/177132 A1, the tread of which has on the shoulder side in each case a largely unstructured profile rib and, between these profile ribs, four further profile ribs which are traversed by narrow sipes running in a wavy manner in plan view. All profile ribs are separated from one another by circumferential grooves, with wide circumferential grooves being formed for the shoulder-side profile ribs. A circumferential groove runs along the tire equator, which circumferential groove has a sipe-like narrow section and a channel which is located in the interior of the tread and which has the groove bottom. This channel has a height of 25% to 75% of the intended profile depth and has a width of 3.0 mm to 9.0 mm at its widest point. At the channel bottom there are small elevations lined up in the circumferential direction which are intended to promote the ejection of stones from the channel. A commercial vehicle tire with such a tread should have good wet braking properties and at the same time have high wear resistance.

Circumferential grooves with sipe-like narrow sections and channels located in the interior of the tread, having the groove bottom and configured to be substantially wider than the narrow section are particularly advantageous in the central or middle tread region. The sipe-like narrow section ensures a high profile rigidity at the beginning of the tread wear and therefore a low and even wear of the tread, and the channel ensures good braking properties in the wet when the tread has been widely worn away. If profile ribs are now provided in the tread and are traversed by transverse grooves, there result crossing points of the transverse grooves with the circumferential grooves mentioned. The risk of stones getting trapped in the channel regions is particularly high precisely at these crossing points. Trapped stones can cause damage, especially tears, in the rubber material of the tread.

The invention is therefore based on the object of significantly reducing the risk of stones getting trapped in a commercial vehicle tire of the type mentioned at the outset in the region of the entry points of transverse grooves into the circumferential grooves provided with a channel.

The stated object is achieved according to the invention in that, opposite the entry points, a projection is formed locally in each case on the channel wall located opposite the entry points of the transverse grooves.

In this way, the volume of the channel region, which is particularly susceptible to stone trapping at the entry points of transverse grooves into the circumferential groove, is reduced by locally formed projections. The projections also act as elements that promote stone ejection. Since the projections are only formed locally, they also have no negative effects on the water drainage ability of the transverse grooves and the channel.

In a possible configuration of the profiling of the tread of the commercial vehicle tire, at least one sipe is formed in profile blocks of that profile rib which adjoins the circumferential groove provided with the channel, which sipe also opens into the circumferential groove. Opposite the entry points, a projection is preferably also formed locally in each case on the channel wall located opposite the entry points of these sipes. Projections in the region of the entry points of sipes are also advantageous in order to avoid stones getting trapped in the circumferential groove.

It is advantageous for the stability of the projections if they are also connected to the channel bottom.

Also of particular advantage is an embodiment in which the projections are adapted to the width of the transverse grooves or sipes, in that the projections are elongated in the circumferential direction of the channel and have an extension length in the circumferential direction such that the entry points of the transverse grooves or of the sipes are projected beyond by 1.5 mm to 3.0 mm on both sides in a worn state in which the tread is worn down to the channel.

For a particularly effective action of the projections, further features of their configuration are particularly advantageous and preferred.

In one of these configurations, the projections have a cross-sectional area centrally opposite the entry points of the transverse grooves or sipes which is at least 10% and up to 50% of the channel cross-sectional area. In a further preferred configuration, the projections reach at most up to the channel center.

A further preferred and advantageous configuration is that the projections have a height in the radial direction which is 30% to 100%, preferably up to 50%, of the extension length of the channel in the radial direction.

For a good water drainage capacity of the channel, it is advantageous if the two channel walls of the channel have wall sections starting from the channel bottom which each run at an angle of 5° to 15°, in particular 10°, to the radial direction and extend over 70% to 80% of the radial extension length of the channel. In addition, it is preferred if the channel has in the radial direction an extension length of 30% to 60% of the profile depth and a maximum width of 4.0 mm to 9.0 mm.

In a further preferred embodiment, the sipe-like narrow section of the circumferential groove has an in particular constant width of 0.8 mm to 1.5 mm and in the radial direction has an extension length which is 30% to 60% of the profile depth.

Preferably, the circumferential groove also has a radially outer section that widens in a V shape toward the tread periphery and is delimited by groove wall sections which run at an angle of 30° to 50° to the radial direction, this section having a width of 2.5 mm to 6.0 mm at the tread periphery. This section ensures good wet braking properties with a new tire.

Figure 3A:
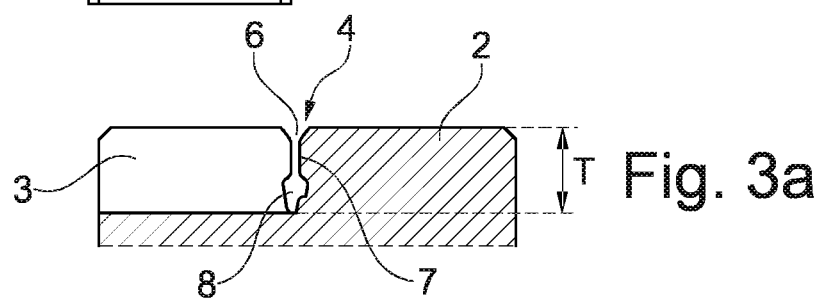

Further features, advantages and details of the invention will now be described in more detail on the basis of the schematic drawing, which illustrates exemplary embodiments. In the drawing:

FIG. 1 shows a plan view of circumferential sections of two profile ribs of a tread of a commercial vehicle tire with a first embodiment of the invention, FIG. 1a is a sectional view along the line Ia-Ia of FIG. 1, FIG. 1b shows a view of the contours of the circumferential groove which are present in the section according to FIG. 1a in an enlarged representation, FIG. 1c shows a variant in a representation analogous to FIG. 1b, FIG. 2 shows a variant of the embodiment of the invention shown in FIG. 1, also by way of a circumferential section of two profile ribs of a tread of a commercial vehicle tire, FIG. 2a is a sectional view along the line IIa-IIa of FIG. 2, FIG. 3 shows a variant of the embodiment shown in FIG. 2, also by way of a circumferential section of two profile ribs of a tread of a commercial vehicle tire and FIG. 3a is a sectional view along the line IIIa-IIIa of FIG. 3.

FIG. 1, FIG. 2 and FIG. 3 each show a circumferential section of two profile ribs of a tread of a commercial vehicle tire which run next to one another and are separated from one another by a circumferential groove 4. The circumferential grooves provided in the tread can run in a straight, zigzag or wavy manner in the circumferential direction. The commercial vehicle tire can be a radial type tire of conventional design, in particular a tire for trucks.

Each profile rib 1 consists of profile blocks 2 which follow one another in the circumferential direction of the tread and are each separated from one another by a transverse groove 3, with in each case three profile blocks 2 of each profile rib 1 being shown in FIGS. 1 to 3. Each profile rib 1 is preferably laterally adjoined by a further circumferential groove (not shown) which separates the respective profile rib 1 from a further profile rib. In the exemplary embodiments illustrated schematically, rectangular profile blocks 2 and transverse grooves 3 running in the axial direction are shown. In an actual configuration of the profile ribs 1, the profile blocks 2 usually have a shape that deviates from the rectangular shape and the transverse grooves 3 usually extend at least in sections at an acute angle, which is in particular up to 50°, preferably 10° to 30°, to the axial direction. The circumferential groove 4 and the transverse grooves 3 preferably have a depth which corresponds to the profile depth T which is provided for the respective tread (see, for example, FIG. 1a) and which is of the order of 8.0 mm to 24.0 mm for commercial vehicle tires. In the center of each profile block 2 there is in each case provided a sipe 5 which extends in the axial direction and runs in a wavy or zigzag shape in plan view. The sipes 5 have a width in the order of 0.4 mm to 1.2 mm, and their depth corresponds at most to the intended profile depth T, the sipes 5 being able to have sections of different depths.

The circumferential groove 4 has a special cross section in those circumferential sections in which there are no entry regions of transverse grooves 3, which will now be explained in more detail with reference to FIGS. 1a, 2a and 3a and to FIG. 1b. The circumferential groove 4 is made up in the radial direction, starting at the tread periphery, of three differently shaped regions or sections, namely a radially outer section 6 that widens in a V shape toward the tread periphery, a narrow middle section 7 that adjoins this and runs in the radial direction, and a channel 8 encompassing the groove bottom. The radially outer section 6 widened in a V shape is delimited by groove wall sections 6a, which run at an angle α of 30° to 50° to the radial direction, the width $b_1$ of the section 6 at the tread periphery being 2.5 mm to 6.0 mm. The groove wall sections 6a extend along the entire length of the profile blocks 2 in the circumferential direction. The outer section 6 widened in a V shape has an extension length $e_1$ in the radial direction which is 10% to 30% of the profile depth T. The middle section 7 adjoining the section 6 has a constant width $b_2$ from 0.8 mm to 1.2 mm and in the radial direction has an extension length $e_2$ which is 30% to 60% of the profile depth T.

The channel 8, which is elongated in the radial direction and widens radially outward, has an extension $e_3$ in this direction from 30% to 60% of the profile depth T. The channel 8 is delimited by a channel bottom 8a and lateral channel walls 8b that curve into the tread and consist of two wall sections $8b_1$ and $8b_2$, respectively a lateral wall section $8b_1$ and an upper wall section $8b_2$ extending toward the central section 7, with the transitions each being rounded. The lateral wall sections $8b_1$ run in opposite directions to one another while being inclined in each case at an angle β of 5° to 15°, in particular 10°, to the radial direction and extend over 70% to 80% of the extension length $e_3$. The channel 8 has its greatest width $b_3$ at the transition region from the wall sections $8b_1$ into the wall sections $8b_2$. In a possible and preferred embodiment of the circumferential groove 4, $e_1$ is 2.0 mm to 4.0 mm, $e_2$ and $e_3$ are each 6.0 mm to 9.0 mm and the width $b_3$ is 5.0 mm to 7.0 mm.

As FIGS. 1 to 3 and the sectional views in FIGS. 1a, 1b, 2a and 3a show, in the channel 8, connected to the channel bottom 8a and one of the channel walls 8b, there are projections 9 which are elongated in the circumferential direction of the channel 8. In the middle section, each projection 9 reaches at most up to the channel center and has a height h in the radial direction and along the channel wall 8b which, in the preferred embodiment shown in FIG. 1b, is up to 50% of the extension length $e_3$ of the channel 8 in the radial direction. On the channel bottom 8a, the projection 9 extends in particular at most up to the middle of the channel bottom 8a. In the two exemplary embodiments shown in FIGS. 1 and 2, the projections 9 are each located on that lateral channel wall 8b which is located opposite the entry point of a transverse groove 3. In the circumferential direction, each projection 9 extends over an extension length $l_v$, which projects beyond the width of the entry point of the transverse groove 3 on both sides by 1.5 mm to 3.0 mm in a worn state in which the tread is worn down to the channel 8 (the section 7 has already completely disappeared due to wear). When considered in plan view, the outer surface of the projections 9 is rounded arcuately outward as a whole.

In a representation analogous to FIG. 1a, FIG. 1c shows a further embodiment variant of a projection 9' which is connected to the channel wall 8b and the channel bottom 8a and reaches up to the upper wall section $8b_2$ and has a substantially radially extending outer surface.

In its middle, therefore also centrally opposite the entry region of the transverse groove 3, each projection 9, 9' has a cross-sectional area which is at least 10% and up to 50% of the channel cross-sectional area.

In the embodiment shown in FIG. 1, the two profile ribs 1 are offset from one another in the circumferential direction in the order of 50% of the circumferential length of the profile blocks 2, so that the transverse grooves 3 in the one profile rib 1 are aligned with the sipes 5 in the second profile rib 1. The projections 9 are located opposite the entry points of the transverse grooves 3.

The embodiment shown in FIG. 2 differs from that according to FIG. 1 in that the two profile ribs 1 are each offset from one another in the order of 25% of the circumferential extension length of the profile blocks 2.

The exemplary embodiment shown in FIG. 3 largely corresponds to that according to FIG. 2, with projections 9 being located both opposite the entry points of the transverse grooves 3 and opposite the entry points of the sipes 5 in the channel 8.

As can be understood in particular from the sectional views, with increasing tread wear, first the radially outer section 6 widened in a V shape disappears, then the narrow middle section 7 until finally, as the wear progresses further, the channel 8 appears. With a new tire and low wear, the section of the circumferential groove that is widened in a V shape ensures good braking properties in the wet, the narrow, middle section 7 allows its groove wall sections to support one another, guarantees high profile rigidity and therefore ensures good handling properties and low and even wear. The larger volume when reaching the channel 8 as the tread wears down ensures good braking properties in the wet due to the high water absorption capacity. The tread has increased in rigidity due to the wear, so that the larger volume in the channel 8 is not a disadvantage in this respect. The projections 9, 9' formed in the circumferential groove 4 locally reduce the bulging region in the channel 8 in relation to the entries of the transverse grooves, so that the risk of stones getting trapped is noticeably reduced at these points, which are otherwise sensitive to stone trapping.

LIST OF REFERENCE SIGNS

1 . . . Profile rib
2 . . . Profile block
3 . . . Transverse groove
4 . . . Circumferential groove
5 . . . Sipe
6 . . . Section
6a . . . Groove wall section
7 . . . Section
8 . . . Channel
8a . . . Channel bottom
8b . . . Channel wall
$8b_1$, $8b_2$ . . . Channel wall section
9, 9' . . . Projection
$b_1$, $b_2$, $b_3$ . . . Width
α, β . . . Angle
$e_1$, $e_2$, $e_3$ . . . Extension length
$l_v$ . . . Extension length
h . . . Height
T . . . Profile depth

The invention claimed is:

1. A commercial vehicle tire comprising a tread with circumferential grooves formed to a profile depth, which divide the tread into at least two profile ribs (1) running in a central region of the tread with profile blocks (2) separated from one another by transverse grooves (3) and into shoulder-side profile ribs, wherein at least one circumferential groove (4) adjoining at least one of the at least two profile ribs (1) has, in a cross section view, a radially outer sipe-like narrow section (6) and a channel (8) adjoining this in an interior of the tread which is configured to be wider than the sipe-like narrow section (6) and which is delimited by two channel walls (8b) and a channel bottom (8a) forming a groove bottom, and wherein the at least one circumferential groove (4) is interrupted in its course by entry points of the transverse grooves (3);
   wherein, opposite the entry points, a projection (9, 9') is formed locally in each case on the channel walls (8b) located opposite the entry points of the transverse grooves (3);
   wherein the projection (9, 9') has an outer surface that extends parallel to the channel wall on which the respective projection is formed, the projection (9, 9') being connected to the channel bottom (8a) and having a height (h) in a radial direction which is up to 50% of an extension length ($e_3$) of the channel (8) in the radial direction.

2. The commercial vehicle tire as claimed in claim 1 further comprising at least one sipe (5) comprised in each of the profile blocks (2) which adjoins the circumferential groove (4) provided with the channel (8), the sipes (5) opening into the circumferential groove (4), and wherein, opposite the entry points, an additional projection (9, 9') is also formed locally in each case on the channel wall (8b) located opposite the entry points of sipes (5).

3. The commercial vehicle tire as claimed in claim 1, wherein the projection (9, 9') has a cross-sectional area centrally opposite the entry points of the transverse grooves (3) that is at least from 10% and up to 50% of a channel cross-sectional area.

4. The commercial vehicle tire as claimed in claim 1, wherein the projection (9, 9') has a height (h) in a radial direction which is from 30% to 50% of an extension length ($e_3$) of the channel (8) in the radial direction.

5. The commercial vehicle tire as claimed in claim 1, wherein the two channel walls (8b) of the channel (8) have wall sections ($8b_1$) starting from the channel bottom (8a) which each run at an angle (β) of 5° to 15° relative a radial direction and extend over 70% to 80% of a radial extension length ($e_3$) of the channel (8).

6. The commercial vehicle tire as claimed in claim 1, wherein the two channel walls (8b) of the channel (8) have wall sections ($8b_1$) starting from the channel bottom (8a) which each run at an angle (β) of 10° relative a radial direction and extend over 70% to 80% of a radial extension length ($e_3$) of the channel (8).

7. The commercial vehicle tire as claimed in claim 1, wherein the channel (8) has in a radial direction an extension length ($e_3$) from 30% to 60% of a profile depth (T) and a maximum width ($b_3$) of from 4.0 mm to 9.0 mm.

8. The commercial vehicle tire as claimed in claim 1, wherein a sipe-like narrow section (7) of the at least one circumferential groove (4) has a constant width ($b_2$) of from 0.8 mm to 1.5 mm, and in a radial direction, has an extension length ($e_2$) which is 30% to 60% of a profile depth (T).

9. The commercial vehicle tire as claimed in claim 1, wherein the at least one circumferential groove (4) has a radially outer section (6) which widens in a V shape toward a tread periphery and is delimited by groove wall sections (6a) which run at an angle (α) of from 30° to 50° relative a radial direction, and wherein the radially outer section (6) has a width ($b_1$) of from 2.5 mm to 6.0 mm at the tread periphery.

10. The commercial vehicle tire as claimed in claim 1 which is of a radial design.

11. A commercial vehicle tire comprising a tread with circumferential grooves formed to a profile depth, which divide the tread into at least two profile ribs (1) running in a central region of the tread with profile blocks (2) separated from one another by transverse grooves (3) and into shoulder-side profile ribs, wherein at least one circumferential groove (4) adjoining at least one of the at least two profile ribs (1) has, in a cross section view, a radially outer sipe-like narrow section (6) and a channel (8) adjoining this in an interior of the tread which is configured to be wider than the sipe-like narrow section (6) and which is delimited by two channel walls (8b) and a channel bottom (8a) forming a groove bottom, and wherein the at least one circumferential groove (4) is interrupted in its course by entry points of the transverse grooves (3);

wherein, opposite the entry points, a projection (9, 9') is formed locally in each case on the channel walls (8b) located opposite the entry points of the transverse grooves (3);

wherein the projection (9, 9') has an outer surface that extends parallel to the channel wall on which the respective projection is formed, the projection (9, 9') having a height (h) in a radial direction which is up to 50% of an extension length ($e_3$) of the channel (8) in the radial direction; and wherein the projection (9, 9') has a cross-sectional area centrally opposite the entry points of the transverse grooves (3) that is at least from 10% and up to 50% of a channel cross-sectional area.

12. A commercial vehicle tire comprising a tread with circumferential grooves formed to a profile depth, which divide the tread into at least two profile ribs (1) running in a central region of the tread with profile blocks (2) separated from one another by transverse grooves (3) and into shoulder-side profile ribs, wherein at least one circumferential groove (4) adjoining at least one of the at least two profile ribs (1) has, in a cross section view, a radially outer sipe-like narrow section (6) and a channel (8) adjoining this in an interior of the tread which is configured to be wider than the sipe-like narrow section (6) and which is delimited by two channel walls (8b) and a channel bottom (8a) forming a groove bottom, and wherein the at least one circumferential groove (4) is interrupted in its course by entry points of the transverse grooves (3);

wherein, opposite the entry points, a projection (9, 9') is formed locally in each case on the channel walls (8b) located opposite the entry points of the transverse grooves (3);

wherein the projection (9, 9') has an outer surface that extends parallel to the channel wall on which the respective projection is formed, the projection (9, 9') having a height (h) in a radial direction which is up to 50% of an extension length ($e_3$) of the channel (8) in the radial direction; and wherein the projection (9, 9') has a height (h) in a radial direction which is from 30% to 50% of an extension length ($e_3$) of the channel (8) in the radial direction.

* * * * *